United States Patent
Jesionowski et al.

(10) Patent No.: US 11,704,040 B2
(45) Date of Patent: Jul. 18, 2023

(54) TRANSPARENT DRIVE-TO-DRIVE COPYING

(71) Applicant: International Business Machines Corporation, Armonk, NY (US)

(72) Inventors: Lee Jesionowski, Tucson, AZ (US); Brian Gerard Goodman, Tucson, AZ (US); Ronald Faye Hill, Jr., Tucson, AZ (US); Jason L. Peipelman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 16/708,090

(22) Filed: Dec. 9, 2019

(65) Prior Publication Data
US 2021/0173578 A1 Jun. 10, 2021

(51) Int. Cl.
*G06F 3/06* (2006.01)

(52) U.S. Cl.
CPC .......... *G06F 3/0647* (2013.01); *G06F 3/0604* (2013.01); *G06F 3/0635* (2013.01); *G06F 3/0653* (2013.01); *G06F 3/0659* (2013.01); *G06F 3/0685* (2013.01)

(58) Field of Classification Search
CPC .... G06F 3/0647; G06F 3/0685; G06F 3/0659; G06F 3/0653; G06F 3/0604; G06F 3/065; G11B 15/689; G11B 27/032
USPC ................... 369/30.06; 711/4, 154; 700/214; 720/632
See application file for complete search history.

(56) References Cited

U.S. PATENT DOCUMENTS

| | | | |
|---|---|---|---|
| 5,392,266 A * | 2/1995 | Kobayashi | G11B 17/225 360/98.04 |
| 6,851,031 B2 | 2/2005 | Trimmer et al. | |
| 8,595,434 B2 | 11/2013 | Northcutt et al. | |
| 8,675,296 B2 | 3/2014 | Amir et al. | |
| 10,289,337 B1 | 5/2019 | Manghi et al. | |
| 2003/0004980 A1* | 1/2003 | Kishi | G06F 11/1458 |
| 2005/0249078 A1* | 11/2005 | Hwang | G11B 20/1217 |

(Continued)

FOREIGN PATENT DOCUMENTS

EP 1912117 A2 4/2008

OTHER PUBLICATIONS

Dawson, E., "DFSMS SMStape: Overview," Share in Orlando, Session: 17811, 2015, pp. 1-60.
Goodman et al., U.S. Appl. No. 16/224,632, filed Dec. 18, 2018.

*Primary Examiner* — Andrew J Cheong
(74) *Attorney, Agent, or Firm* — Zilka-Kotab, P.C.

(57) ABSTRACT

A computer-implemented method includes initiating a copy request for a data storage cartridge. The data storage cartridge includes data storage media having host data thereon. The method also includes transparently loading the data storage cartridge into a first data storage drive of a data storage library and establishing drive-to-drive communication for copying data from the data storage media in the first data storage drive to data storage media in a second data storage drive. The method includes copying data from the data storage media in the first data storage drive to the data storage media in the second data storage drive. A system includes a processor and logic integrated with the processor, executable by the processor, or integrated with and executable by the processor. The logic is configured to perform the foregoing method.

19 Claims, 12 Drawing Sheets

(56) References Cited

U.S. PATENT DOCUMENTS

| | | | |
|---|---|---|---|
| 2007/0220313 A1* | 9/2007 | Katsuragi | G06F 11/0727 714/6.22 |
| 2008/0010396 A1* | 1/2008 | Itou | G11B 20/00876 711/100 |
| 2008/0059734 A1* | 3/2008 | Mizuno | G06F 11/1471 711/111 |
| 2008/0065582 A1* | 3/2008 | Goodman | G06F 3/0617 |
| 2009/0174965 A1* | 7/2009 | Greco | H04L 9/0822 360/92.1 |
| 2010/0265807 A1* | 10/2010 | Thompson | G11B 20/1803 369/53.41 |
| 2011/0238905 A1* | 9/2011 | Amir | G11B 23/042 711/111 |
| 2011/0238906 A1* | 9/2011 | Amir | G06F 3/0617 711/111 |
| 2013/0101373 A1* | 4/2013 | Starr | B65G 1/0407 414/267 |
| 2015/0012696 A1 | 1/2015 | Inai | |
| 2018/0081553 A1* | 3/2018 | Freitag | G06F 3/0634 |
| 2019/0114088 A1 | 4/2019 | Vijayan et al. | |
| 2021/0124504 A1* | 4/2021 | Chiu | G06F 3/0647 |

* cited by examiner

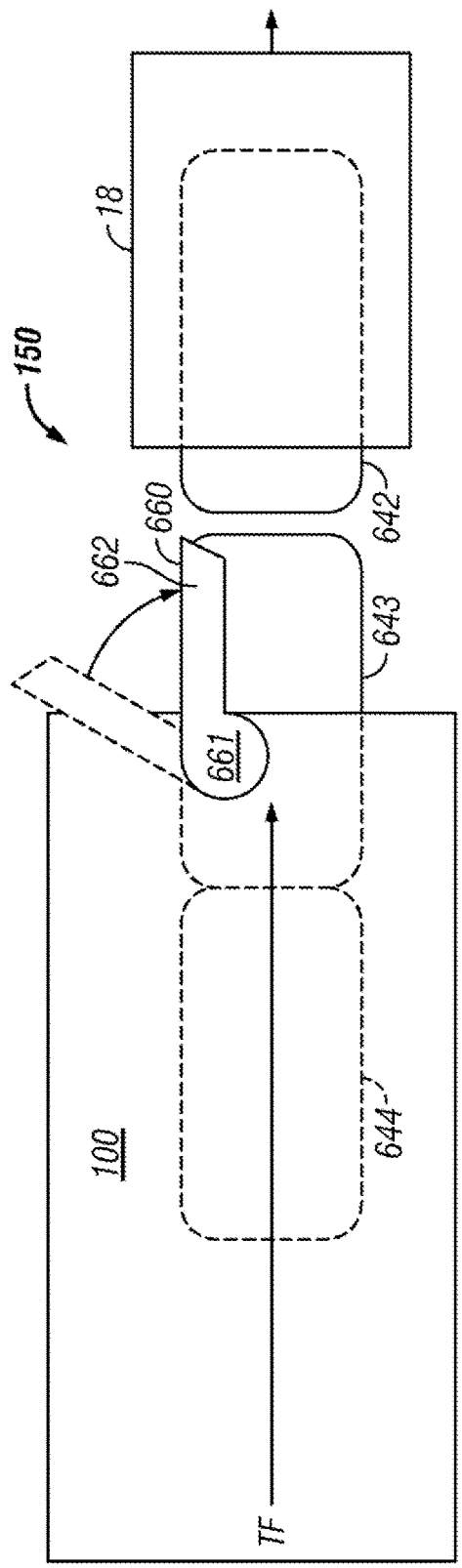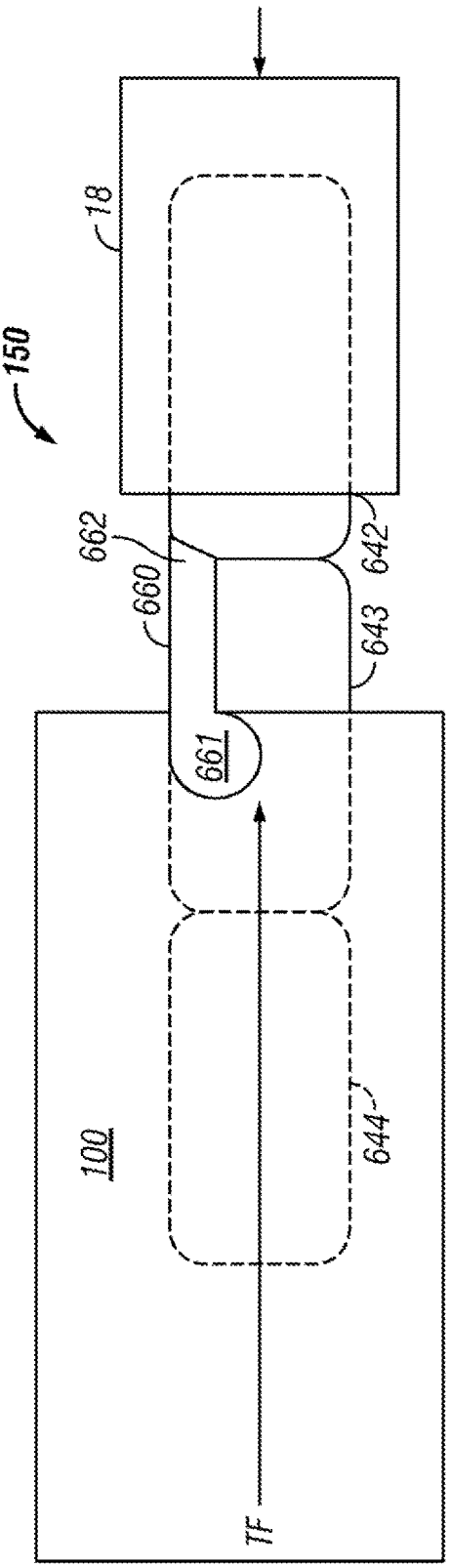
FIG. 8C
FIG. 8D

TRANSPARENT DRIVE-TO-DRIVE COPYING

BACKGROUND

The present invention relates to data storage systems, and more particularly, this invention relates to transparent copying from a source cartridge in an automated data storage library.

Automated data storage libraries are known for providing cost effective storage and retrieval of large quantities of data. The data in automated data storage libraries is typically stored on media of data storage cartridges that are, in turn, stored at storage slots or the like inside the library in a fashion that renders the media, and its resident data, accessible for physical retrieval. Such data storage cartridges are commonly termed "removable media." Data storage cartridge media may comprise any type of media on which data may be stored and which may serve as removable media, including but not limited to magnetic media (such as magnetic tape or disks), optical media (such as optical tape or discs), electronic media (such as PROM, EEPROM, flash PROM, CompactFlash™, Smartmedia™, Memory Stick®, etc.), or other suitable media. An example of a data storage cartridge that is widely employed in automated data storage libraries for mass data storage is a magnetic tape cartridge.

In addition to data storage media, automated data storage libraries typically comprise data storage drives that store data to, and/or retrieve data from, the data storage cartridge media. Further, automated data storage libraries typically comprise I/O stations at which data storage cartridges are supplied or added to, or removed from, the library. The transport of data storage cartridges between data storage slots, data storage drives, and I/O stations is typically accomplished by one or more accessors. Such accessors have grippers for physically retrieving the selected data storage cartridges from the storage slots within the automated data storage library and transporting such cartridges to the data storage drives by moving, for example, in the horizontal (X) and vertical (Y) directions.

In an effort to increase storage capacity, deep slot technology allows for storage cells that contain more than a single data storage cartridge. Such storage libraries allow for higher density, or more cartridges stored per square foot. In 'deep slot' libraries, two or more cartridges may be stored in a multi-cartridge deep slot cell, arrayed in series, one behind the other, in tiers ranging from a frontmost tier to a rearmost tier.

Creating a second copy of all data on magnetic storage medium (e.g., tape media in a tape cartridge) often requires that the application managing the media brings the data back through the host interface and the copying operations typically consume the host computing and storage resources. Conventional copy operations are relatively complex and may not be supported by all tape applications.

SUMMARY

A computer-implemented method, according to one embodiment, includes initiating a copy request for a data storage cartridge. The data storage cartridge includes data storage media having host data thereon. The method also includes transparently loading the data storage cartridge into a first data storage drive of a data storage library and establishing drive-to-drive communication for copying data from the data storage media in the first data storage drive to data storage media in a second data storage drive. The method includes copying data from the data storage media in the first data storage drive to the data storage media in the second data storage drive.

A system, according to another embodiment, includes a processor and logic integrated with the processor, executable by the processor, or integrated with and executable by the processor. The logic is configured to perform the foregoing method.

A computer program product, according to yet another embodiment, includes a computer readable storage medium having program instructions embodied therewith. The program instructions are executable by a computer to cause the computer to perform the foregoing method.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIGS. 8A-8D are partial side views of a cartridge blocking mechanism according to one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, a computer-implemented method includes initiating a copy request for a data storage cartridge. The data storage cartridge includes data storage media having host data thereon. The method also includes transparently loading the data storage cartridge into a first data storage drive of a data storage library and establishing drive-to-drive communication for copying data from the data storage media in the first data storage drive to data storage media in a second data storage drive. The method includes copying data from the data storage media in the first data storage drive to the data storage media in the second data storage drive.

In another general embodiment, a system includes a processor and logic integrated with the processor, executable by the processor, or integrated with and executable by the processor. The logic is configured to perform the foregoing method.

In another general embodiment, a computer program product includes a computer readable storage medium having program instructions embodied therewith. The program instructions are executable by a computer to cause the computer to perform the foregoing method.

Figure 1:
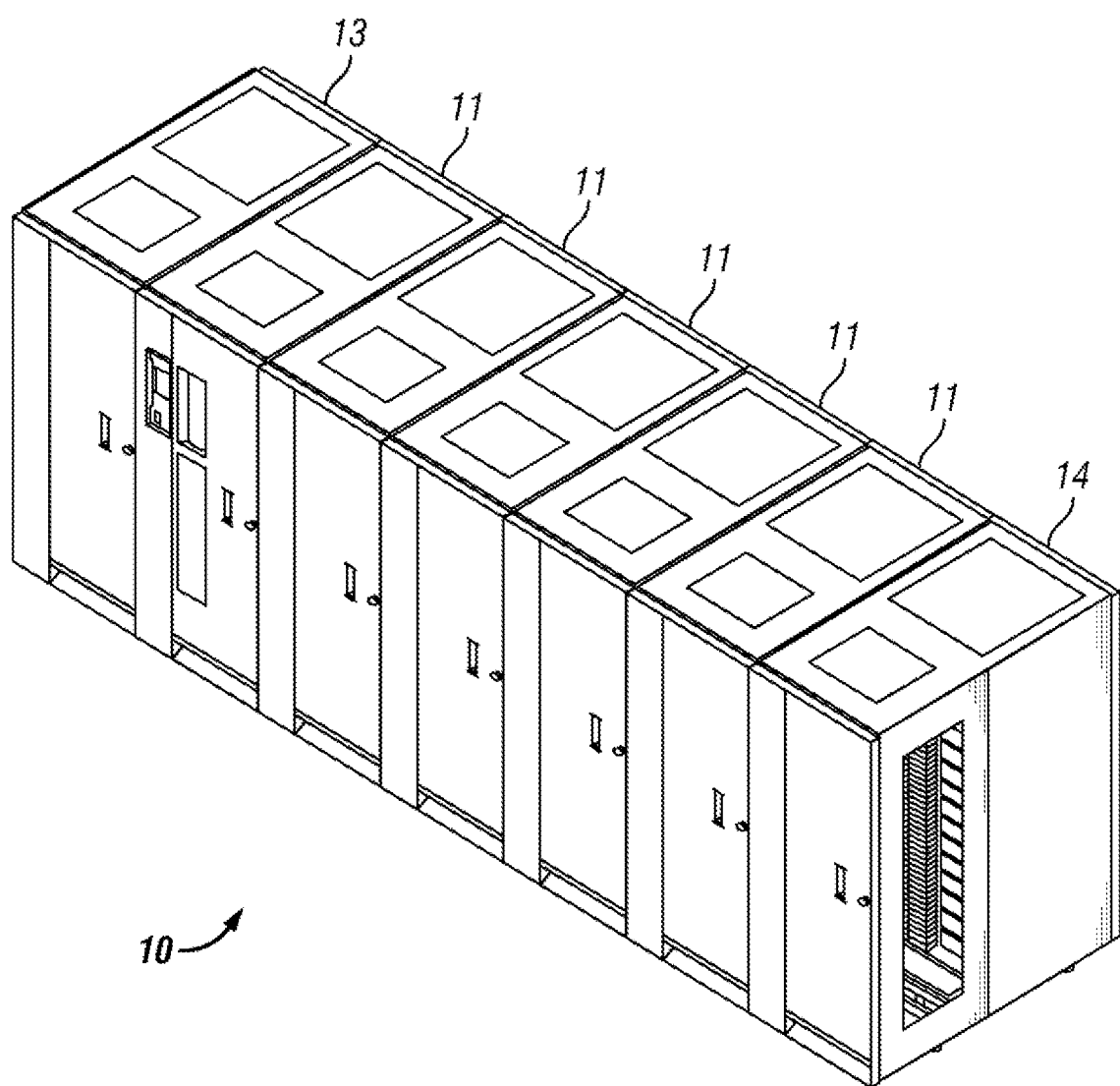
FIG. 1 is a perspective view of an automated data storage library according to one embodiment.
Figure 2:
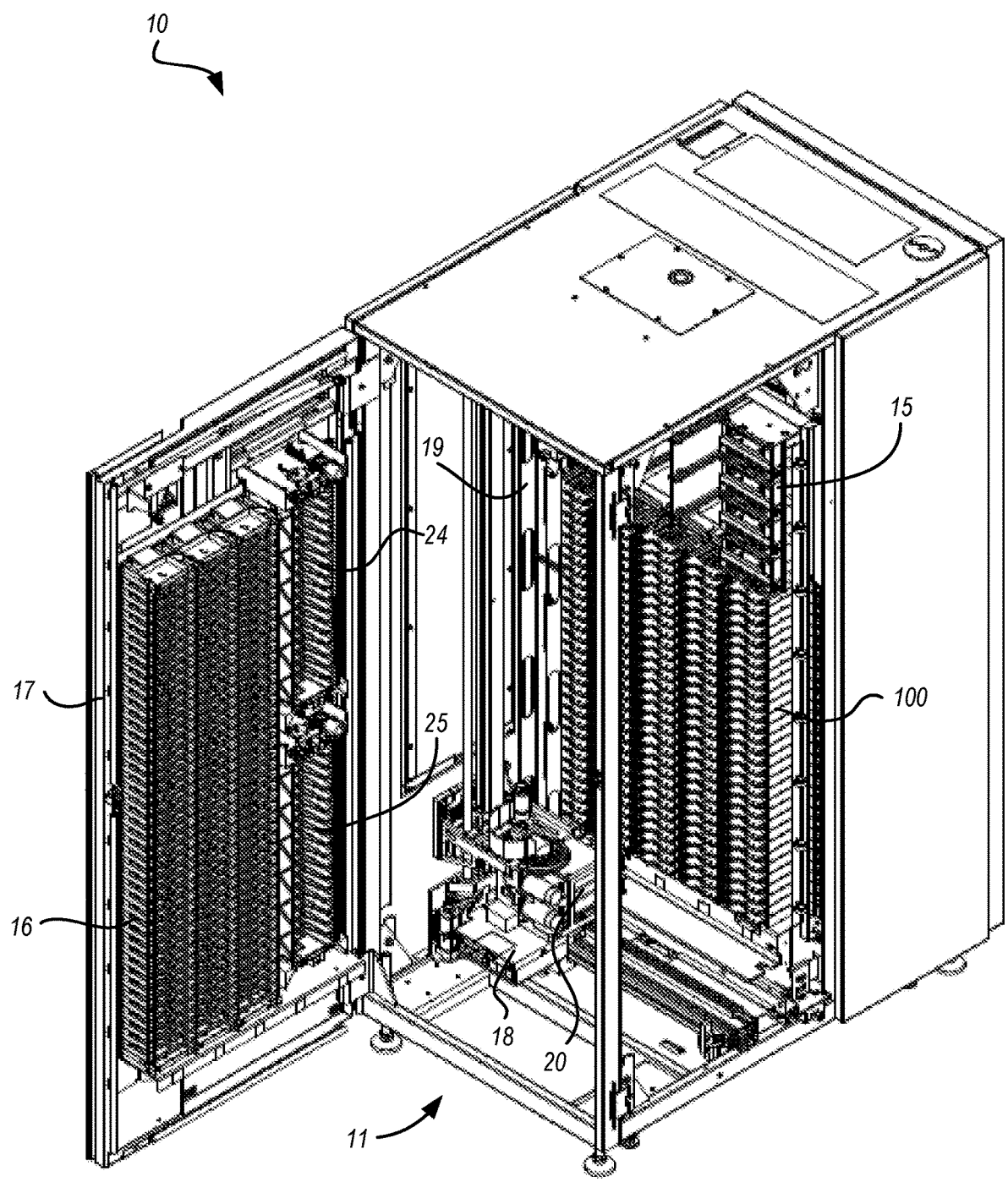
FIG. 2 is a perspective view of a storage frame from the data storage library of FIG. 1.

FIGS. 1-2 illustrate an automated data storage library 10 which stores and retrieves data storage cartridges, containing data storage media (not shown), from multi-cartridge deep slot cells 100 and single cartridge storage slots 16. An example of an automated data storage library which has a similar configuration as that depicted in FIGS. 1-2, and may be implemented with some of the various approaches herein is the IBM® 3584 UltraScalable Tape Library. Moreover, it should be noted that references to "data storage media" herein refer to data storage cartridges, and for purposes of the present application, the two terms may be used synonymously.

The library 10 of FIG. 1 comprises a left hand service bay 13, one or more storage frames 11, and right hand service bay 14. As will be discussed in further detail below, a frame may comprise an expansion component of the library. Thus, storage frames may be added or removed to expand or reduce the size and/or functionality of the library. According to different approaches, frames may include additional storage slots, deep slot cells, drives, import/export stations, accessors, operator panels, etc.

FIG. 2 shows an exemplary embodiment of a storage frame 11, which acts as the base frame of the library 10. Moreover, the storage frame 11 illustrated in FIG. 2 is contemplated to be a minimum configuration of the library 10, for which there is only a single accessor 18 (i.e., there are no redundant accessors) and no service bay. However, in other embodiments, a storage frame may include multiple robotic accessors and/or service bays.

Looking to FIG. 2, the library 10 is arranged for accessing data storage media in response to commands from at least one external host system (not shown). The library 10 includes a plurality of storage slots 16 on front wall 17 and a plurality of multi-cartridge deep slot cells 100 on rear wall 19, both of which may be used for storing data storage cartridges that may contain data storage media. According to one approach, the storage slots 16 are configured to store a single data storage cartridge, and the multi-cartridge deep slot cells 100 are configured to store a plurality of data storage cartridges. In a preferred approach, the multi-cartridge deep slot cells may be arranged in sequential order of tiers from front to rear (e.g., see FIG. 7A).

With continued reference to FIG. 2, the storage frame 11 of the library 10 also includes at least one data storage drive 15, e.g., for reading and/or writing data with respect to the data storage media. Additionally, a first accessor 18 may be used to transport data storage media between the plurality of storage slots 16, the multi-cartridge deep slot cells, and/or the data storage drive(s) 15. According to various approaches, the data storage drives 15 may be optical disc drives, magnetic tape drives, solid state drives having non-volatile random access memory (NVRAM) such as Flash memory, or other types of data storage drives as are used to read and/or write data with respect to the data storage media.

As illustrated, the storage frame 11 may optionally include an operator panel or other user interface, such as a web-based interface, which allows a user to interact with the library 10. The storage frame 11 may also optionally comprise an upper I/O station 24 and/or a lower I/O station 25, thereby allowing data storage cartridges to be added (e.g., inserted) to the library inventory and/or removed from the library without disrupting library operation. Furthermore, the library 10 may have one or more storage frames 11, each having storage slots 16, preferably accessible by the first accessor 18.

As described above, the storage frames 11 may be configured with different components depending upon the intended function. One configuration of storage frame 11 may comprise storage slots 16 and/or multi-cartridge deep slot cells 100, data storage drive(s) 15, and other optional components to store and retrieve data from the data storage cartridges. However, in another approach, a storage frame 11 may include storage slots 16 and/or multi-cartridge deep slot cells 100 and no other components. The first accessor 18 may have a gripper assembly 20, e.g., for gripping one or more data storage media, in addition to having a bar code scanner or other reading system, such as a cartridge memory reader or similar system mounted on the gripper assembly 20, to "read" identifying information about the data storage media.

Figure 3:
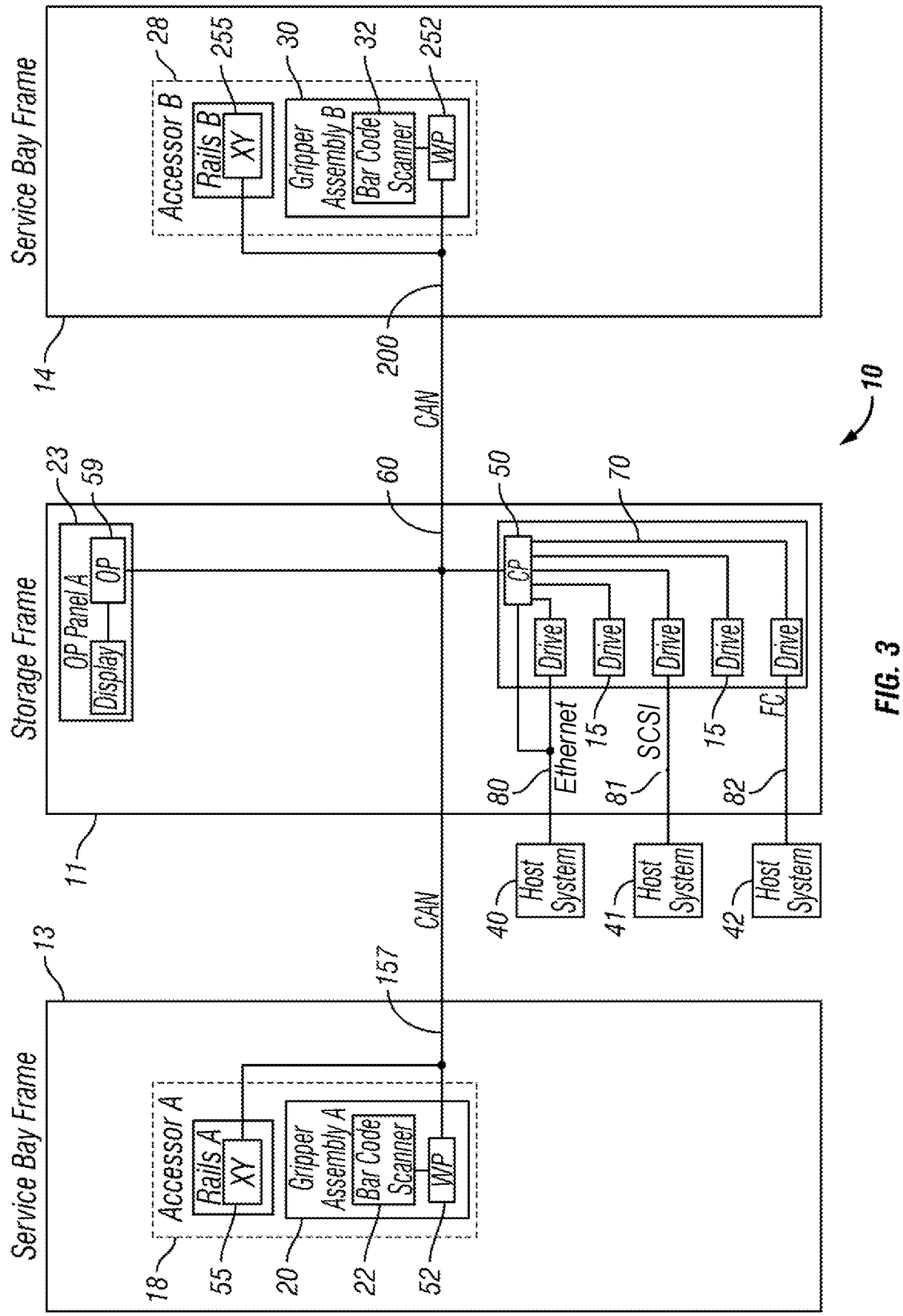
FIG. 3 is a block diagram of an automated data storage library according to one embodiment.

FIG. 3 depicts an automated data storage library 10, in accordance with one embodiment. As an option, the present automated data storage library 10 may be implemented in conjunction with features from any other embodiment listed herein, such as those described with reference to the other FIGS. Of course, however, such automated data storage library 10 and others presented herein may be used in various applications and/or in permutations which may or may not be specifically described in the illustrative embodiments listed herein. Further, the automated data storage library 10 presented herein may be used in any desired environment. Thus FIG. 3 (and the other FIGS.) should be deemed to include any and all possible permutations.

Referring now to FIG. 3, the automated data storage library 10 as described in reference to FIGS. 1 and 2, is depicted according to one embodiment. According to a preferred approach, the library 10 may employ a controller, e.g., arranged as a distributed system of modules with a plurality of processor nodes.

In one approach, the library is controlled, not by a central controller, but rather, by a distributed control system for receiving logical commands and converting the commands to physical movements of the accessor and gripper, and for operating the drives in accordance with the desired physical movements. The distributed control system may also provide logistical support, such as responding to host requests for element status, inventory, library status, etc. The specific commands, the conversion of those commands to physical movements, and the operation of the drives may be of a type known to those of skill in the art.

While the automated data storage library 10 has been described as employing a distributed control system, various other approaches described and/or suggested herein may be implemented in automated data storage libraries regardless of control configuration, such as, but not limited to, an automated data storage library having one or more library controllers that are not distributed.

Referring still to FIG. 3, the library 10 may have one or more storage frames 11, a left hand service bay 13 and a right hand service bay 14. The left hand service bay 13 is shown with a first accessor 18, where, as discussed above, the first accessor 18 may include a gripper assembly 20 and/or a bar code scanner (e.g., reading system) to "read" identifying information about the data storage media depending on the desired embodiment. Furthermore, the right hand service bay 14 is shown having a second accessor 28, which includes a gripper assembly 30 and may also include a reading system 32 to "read" identifying information about the data storage media.

According to one approach, in the event of a failure or other unavailability of the first accessor 18, or its gripper assembly 20, etc., the second accessor 28 may perform some or all of the functions of the first accessor 18. Thus, in different approaches, the two accessors 18, 28 may share one or more mechanical paths, they may have completely independent mechanical paths, or combinations thereof. In one example, the accessors 18, 28 may have a common horizontal rail with independent vertical rails to travel thereal-ong. Moreover, it should be noted that the first and second accessors 18, 28 are described as first and second for descriptive purposes only and this description is not meant to limit either accessor to an association with either the left hand service bay 13, or the right hand service bay 14.

In an exemplary embodiment which is in no way intended to limit the invention, the first and second accessors 18, 28 may preferably move their grippers in at least two directions, called the horizontal "X" direction and vertical "Y" direction, e.g., to retrieve and grip, deliver and release, load and unload, etc. the data storage cartridge at the storage slots 16, multi-cartridge deep slot cells 100, data storage drives 15, etc.

With continued reference to FIG. 3, library 10 receives commands from one or more host systems 40, 41, 42. The host systems 40, 41, 42, such as host servers, communicate with the library directly, e.g., on path 80, through one or more control ports (not shown), or through one or more data storage drives 15 on paths 81, 82. Thus, in different approaches, the host systems 40, 41, 42 may provide commands to access particular data storage cartridges and move the cartridges, for example, between the storage slots 16 and the data storage drives 15. The commands are typically logical commands identifying the cartridges or cartridge media, and/or logical locations for accessing the media. Furthermore, it should be noted that the terms "commands" and "work requests" are used interchangeably herein to refer to such communications from the host system 40, 41, 42 to the library 10 as are intended to result in accessing particular data storage media within the library 10 depending on the desired approach.

According to one embodiment, the library 10 may be controlled by a library controller. Moreover, in various approaches, the library controller may include a distributed control system receiving the logical commands from hosts, determining the required actions, and/or converting the actions to physical movements of the first and/or second accessor 18, 28. In another approach, the distributed control system may have a plurality of processor nodes, each having one or more computer processors. According to one example of a distributed control system, a communication processor node 50 may be located in a storage frame 11. The communication processor node provides a communication link for receiving the host commands, either directly or through the drives 15, via at least one external interface, e.g., coupled to line 80.

Still referring to FIG. 3, the communication processor node 50 may additionally provide a communication link 70 for communicating with the data storage drives 15. As illustrated, the communication processor node 50 may preferably be located in the storage frame 11, e.g., close to the data storage drives 15. Furthermore, one or more additional work processor nodes may be provided to form an exemplary distributed processor system, which may comprise, e.g., a work processor node 52 located at first accessor 18, and that is coupled to the communication processor node 50 via a network 60, 157. According to different approaches, each work processor node may respond to received commands that are broadcast thereto from any communication processor node, and the work processor nodes may also direct the operation of the accessors, e.g., providing move commands. An XY processor node 55 may be provided and may be located at an XY system of first accessor 18. As illustrated, the XY processor node 55 is coupled to the network 60, 157, and is responsive to the move commands, operating the XY system to position the gripper assembly 20.

Also, an operator panel processor node 59 may be provided at the optional operator panel for providing an interface for communicating between the operator panel and the communication processor node 50, the work processor nodes 52, 252, and the XY processor nodes 55, 255.

A network 60, for example comprising a common bus, is provided, coupling the various processor nodes. The network may comprise a robust wiring network, such as the commercially available Controller Area Network (CAN) bus system, which is a multi-drop network, having a standard access protocol and wiring standards, for example, as defined by CiA®, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

As illustrated in FIG. 3, the communication processor node 50 is coupled to each of the data storage drives 15 of a storage frame 11, via lines 70, and are thereby communicating with the drives 15 and with host systems 40, 41, 42. Alternatively, the host systems 40, 41, 42 may be directly coupled to the communication processor node 50, at input 80 for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 3, host connections 80 and 81 are intended to be Ethernet and a SCSI bus, respectively, e.g., and may serve as host connections. However, bus 82 comprises an example of a Fibre Channel bus which is a high speed serial data interface, allowing transmission over greater distances than the SCSI bus systems.

According to some approaches, the data storage drives 15 may be in close proximity to the communication processor node 50, and may employ a short distance communication scheme, such as Ethernet, or a serial connection, such as RS-422. Thus, the data storage drives 15 may be individually coupled to the communication processor node 50 by lines 70. Alternatively, the data storage drives 15 may be coupled to the communication processor node 50 through one or more networks.

Furthermore, additional storage frames 11 may be provided, whereby each is preferably coupled to the adjacent storage frame. According to various approaches, any of the additional storage frames 11 may include communication processor nodes 50, storage slots 16, data storage drives 15, networks 60, etc.

Moreover, as described above, the automated data storage library 10 may comprise a plurality of accessors. A second accessor 28, for example, is shown in a right hand service bay 14 of FIG. 3. The second accessor 28 may include a gripper assembly 30 for accessing the data storage media, and an XY system 255 for moving the second accessor 28. The second accessor 28 may run on the same horizontal mechanical path as the first accessor 18, and/or on an adjacent (e.g., separate) path. Moreover, the illustrative control system additionally includes an extension network 200 which forms a network coupled to network 60 of the storage frame(s) 11 and to network 157 of left hand service bay 13.

In FIG. 3 and the accompanying description, the first and second accessors are associated with the left hand service bay 13 and the right hand service bay 14 respectively. However, this is for illustrative purposes and there may not be an actual association. Thus, according to another approach, network 157 may not be associated with the left hand service bay 13 and network 200 may not be associated with the right hand service bay 14. Moreover, depending on the design of the library, it may not be necessary to have a left hand service bay 13 and/or a right hand service bay 14 at all.

An automated data storage library 10 typically comprises one or more controllers to direct the operation of the automated data storage library. Moreover, host computers and data storage drives typically include similar controllers. A library controller may take many different forms and may comprise, for example, but not limited to, an embedded system, a distributed control system, a personal computer, a workstation, etc. The term "library controller" as used herein is intended in its broadest sense as a device that includes at least one processor, and optionally further circuitry and/or logic, for controlling and/or providing at least some aspects of library operations.

Figure 4:
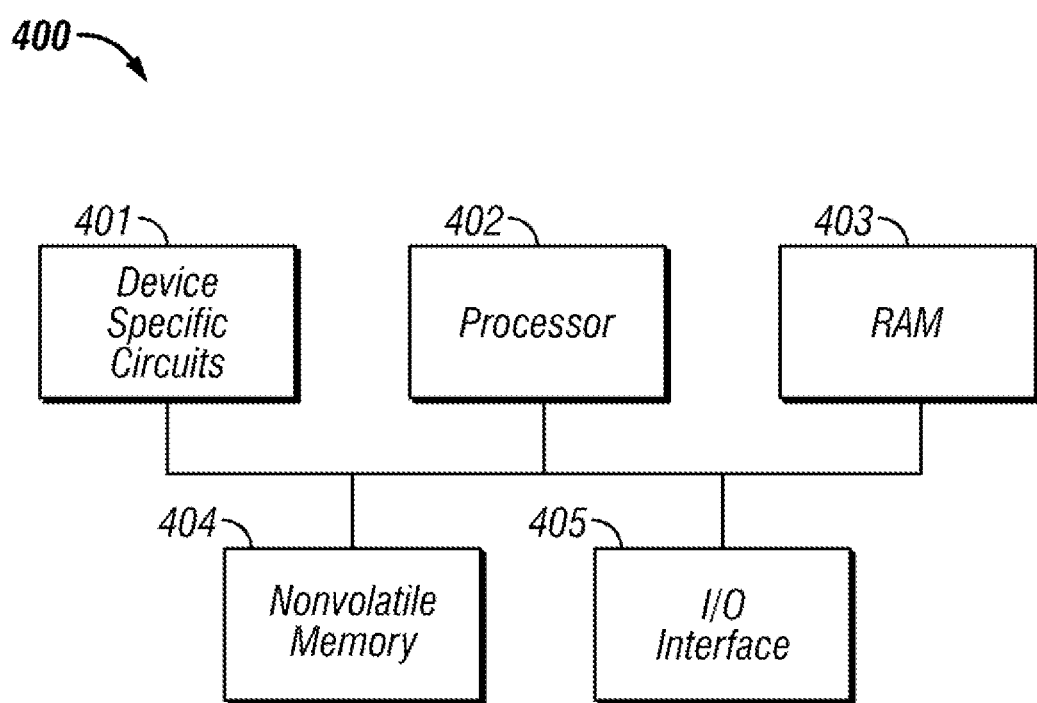
FIG. 4 is a block diagram depicting a controller configuration according to one embodiment.

Referring now to FIG. 4, a typical controller 400 is shown with a processor 402, Random Access Memory (RAM) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, Field Programmable Gate Array (FPGA), Application Specific Integrated Circuit (ASIC), discrete logic, etc. The RAM 403 is typically used to hold variable data, stack data, executable instructions, etc.

According to various approaches, the nonvolatile memory 404 may comprise any type of nonvolatile memory such as, but not limited to, Electrically Erasable Programmable Read Only Memory (EEPROM), flash Programmable Read Only Memory (PROM), battery backup RAM, hard disk drives, etc. However, the nonvolatile memory 404 is typically used to hold the executable firmware and any nonvolatile data. Moreover, the I/O interface 405 comprises a communication interface that allows the processor 402 to communicate with devices external to the controller. Examples may comprise, but are not limited to, serial interfaces such as RS-232, USB (Universal Serial Bus) or Small Computer Systems Interface (SCSI). The device specific circuits 401 provide additional hardware to enable the controller 400 to perform unique functions including, but not limited to, motor control of a cartridge gripper. Moreover, the device specific circuits 401 may include electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

While the automated data storage library 10 is described as employing a distributed control system, the various approaches described and/or suggested herein may be implemented in various automated data storage libraries regardless of control configuration, including, but not limited to, an automated data storage library having one or more library controllers that are not distributed. Moreover, a library controller may comprise one or more dedicated controllers of a library, depending on the desired embodiment. For example, there may be a primary controller and a backup controller. In addition, a library controller may comprise one or more processor nodes of a distributed control system. According to one example, communication processor node 50 (e.g., of FIG. 3) may comprise the library controller while the other processor nodes (if present) may assist the library controller and/or may provide backup or redundant functionality. In another example, communication processor node 50 and work processor node 52 may work cooperatively to form the library controller while the other processor nodes (if present) may assist the library controller and/or may provide backup or redundant functionality. Still further, all of the processor nodes may comprise the library controller. According to various approaches described and/or suggested herein, a library controller may have a single processor or controller, or it may include multiple processors or controllers.

Figure 5A:
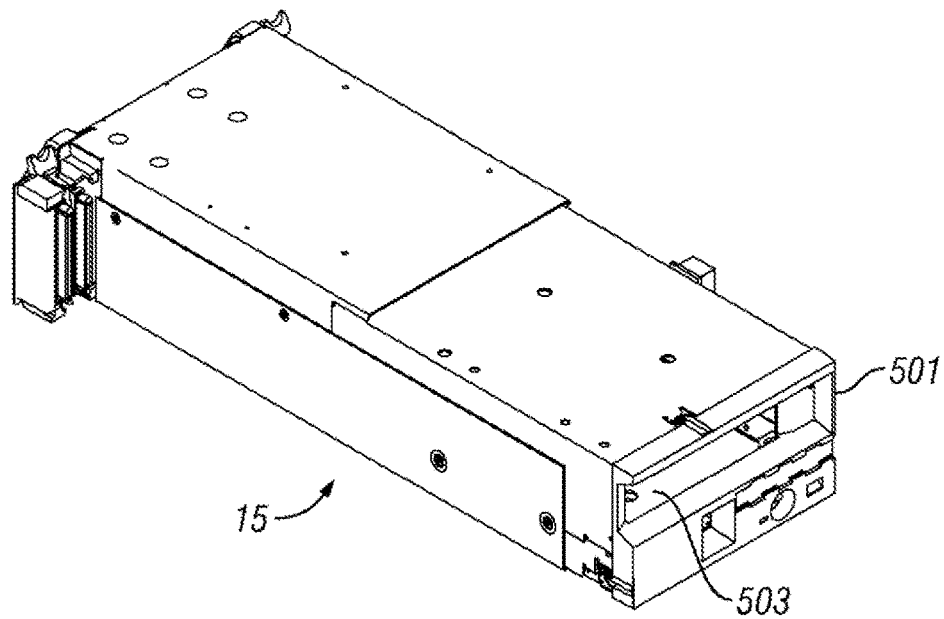
FIG. 5A is a front perspective view of a data storage drive according to one embodiment.
Figure 5B:
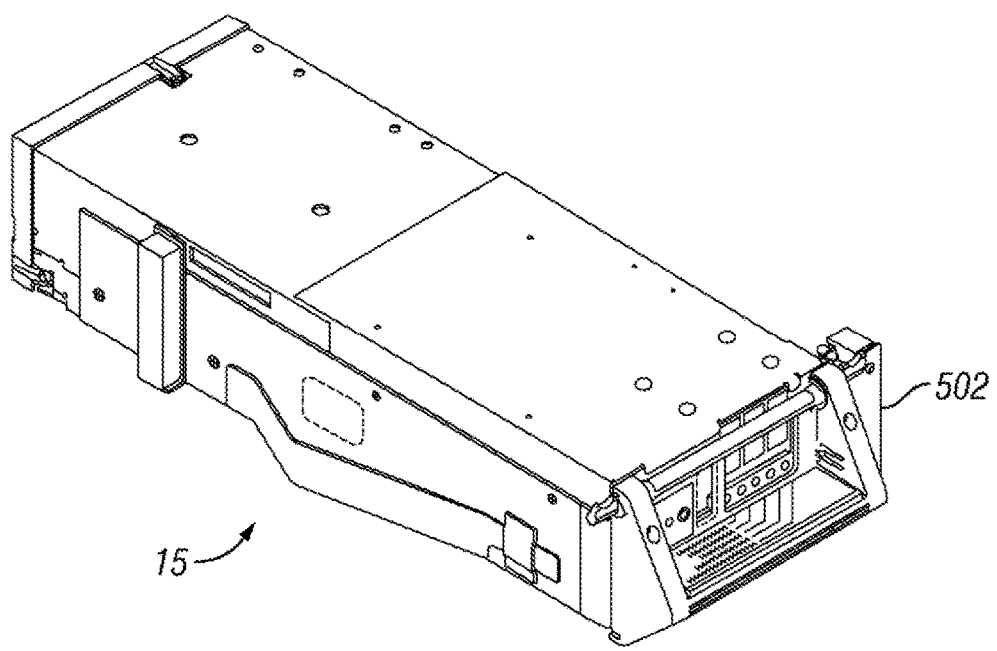
FIG. 5B is a rear perspective view of the data storage drive of FIG. 5A.

FIGS. 5A-5B illustrate the front 501 and rear 502 views of a data storage drive 15, according to one embodiment. In the example depicted in FIGS. 5A-5B, the data storage drive 15 comprises a hot-swap drive canister, which is in no way intended to limit the invention. In fact, any configuration of data storage drive may be used whether or not it includes a hot-swap canister. As discussed above, a data storage drive 15 is used to read and/or write data with respect to the data storage media, and may additionally communicate with a memory which is separate from the media, and is located within the cartridge. Thus, according to one approach, a data storage cartridge may be placed into the data storage drive 15 at opening 503.

Figure 6:
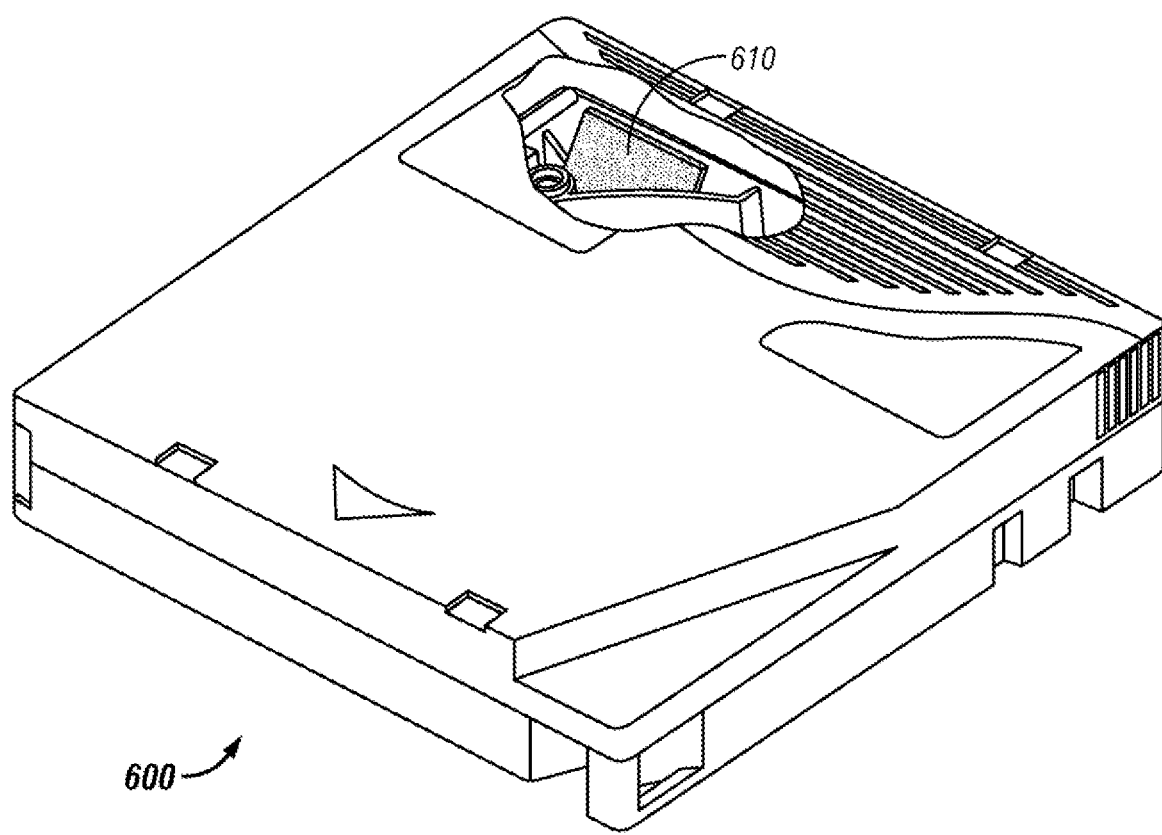
FIG. 6 is perspective view of a data storage cartridge having a cutaway portion, according to one embodiment.

Furthermore, FIG. 6 illustrates an embodiment of a data storage cartridge 600 with a cartridge memory 610 shown in a cutaway portion of the Figure, which is in no way intended to limit the invention. In fact, any configuration of data storage cartridge may be used whether or not it comprises a cartridge memory. According to various approaches, media of the data storage cartridge media may include any type of media on which data may be stored, including but not limited to magnetic media, e.g., magnetic tape, disks, etc.; optical media, e.g., optical tape, discs, etc.; electronic media, e.g., PROM, EEPROM, flash PROM, CompactFlash™, Smartmedia™, Memory Stick®, etc.; etc., or other suitable media. Moreover, an example of a data storage cartridge that is widely employed in automated data storage libraries for mass data storage is a magnetic tape cartridge in which the media is magnetic tape.

Figure 7A:
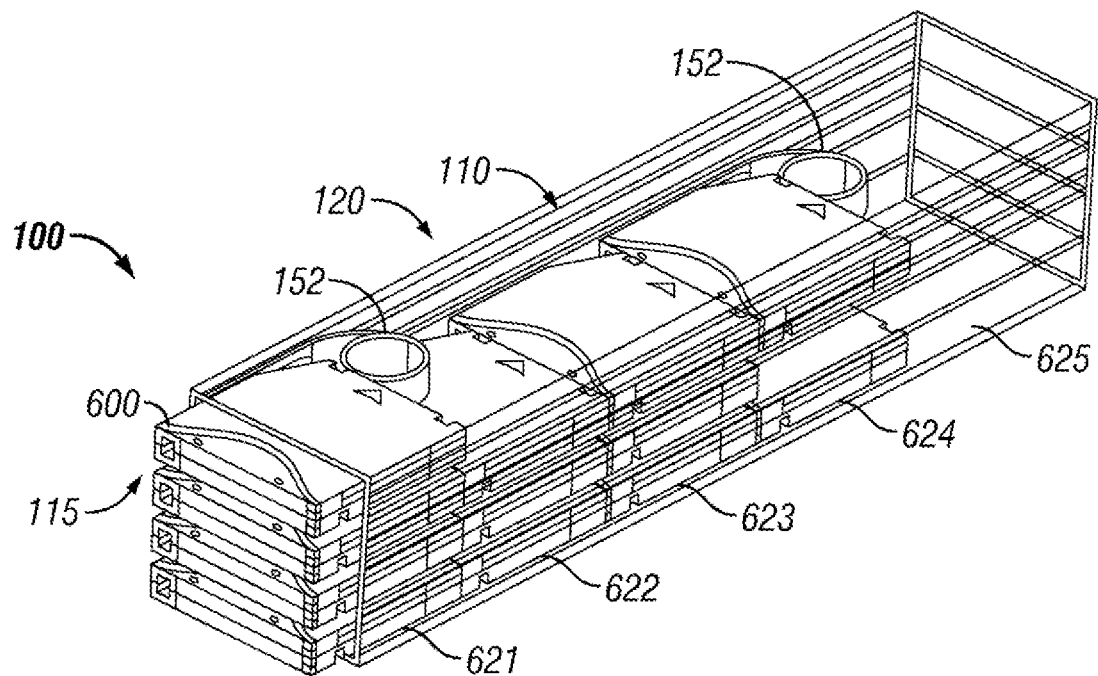
FIGS. 7A-7B are perspective views of a multi-cartridge deep slot cell according to one embodiment.
Figure 7B:
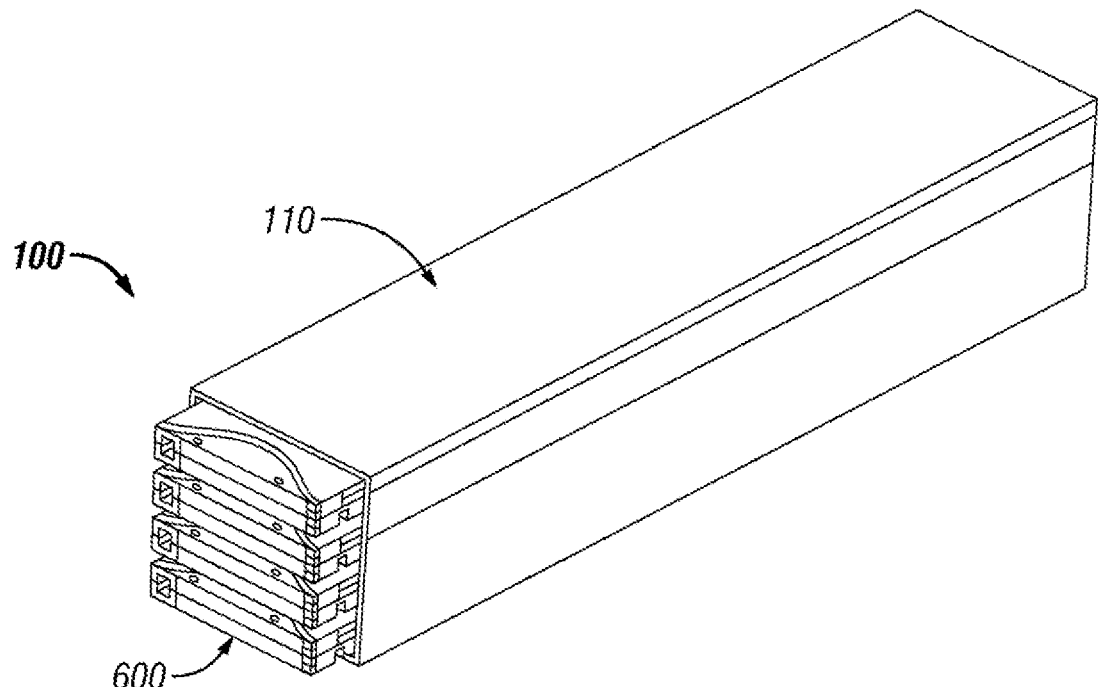

Looking now to FIGS. 7A-7B, a multi-cartridge deep slot cell 100 having biasing springs 152 is depicted according to one embodiment. As shown in the illustrative embodiment, the multi-cartridge deep slot cell 100 comprises a housing 110 defining an interior space 115. Furthermore, a plurality of storage slots 120 is disposed within the housing, and may be configured for storing up to a plurality of data storage cartridges 600, depending on the desired approach. Alternatively, the multi-cartridge deep slot cell 100 may be built into the frame of the automated data storage library according to one approach.

FIGS. 8A-8D illustrate an embodiment of a cartridge blocking mechanism 150 having a retaining gate 660 that retains the data storage cartridges in the multi-cartridge deep slot cell 100 according to one embodiment. As illustrated, according to one approach, the retaining gate 660 may be externally attached to a multi-cartridge deep slot cell 100, relative to a front opening of the multi-cartridge deep slot cell 100, whereby the retaining gate 660 can be activated by an accessor 18, e.g., of an automated tape library. Moreover, the retaining gate 660 allows for positive cartridge retention against the pressure of biasing springs (see 152 of FIGS. 7A-7B), and ensures that one or more data storage cartridges do not get pushed out of the multi-cartridge deep slot cell 100 simultaneously, while allowing the pushing mechanism (not shown) of the multi-cartridge deep slot cell 100 to continuously push data storage cartridge(s) to the opening in a multi-cartridge deep slot cell 100. Thus, according to one approach, the accessor 18 may open the retaining gate to gain access to the data storage cartridge in tier 1 and, upon its extraction, the biasing spring 152 moves the cartridge(s) positioned behind the extracted cartridge forward, thereby promoting the cartridge(s) by one tier as will soon become apparent.

Figure 8A:
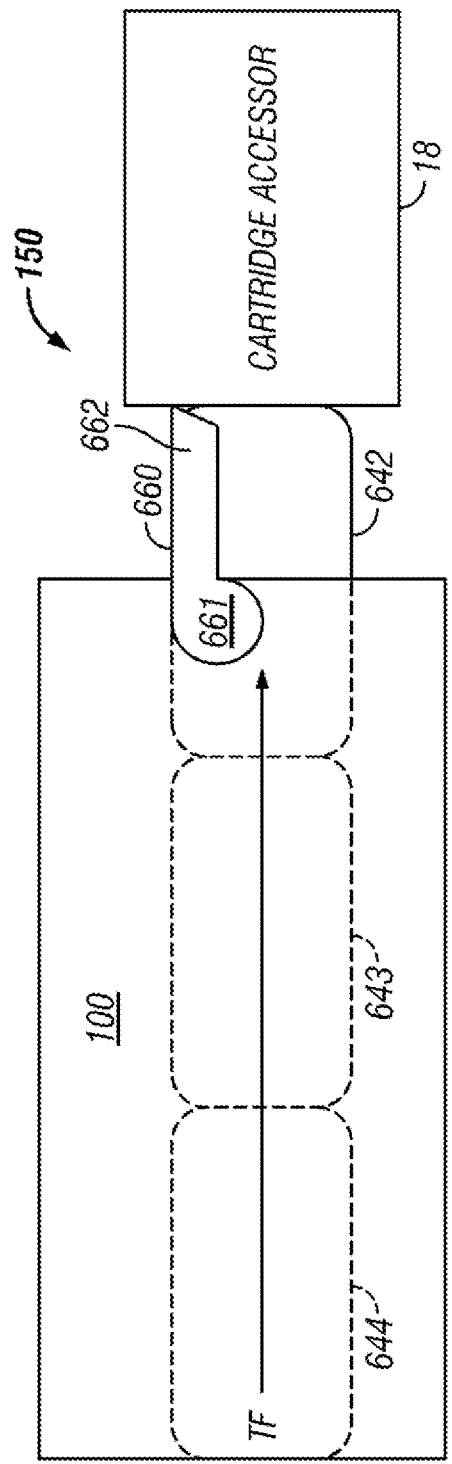

The basic working of the retaining gate is that the gate prevents the data storage cartridge(s) from being pushed out of a multi-cartridge deep slot cell 100. For example, as shown in FIGS. 8A-8D, a retaining gate 660 can be lifted by, for example, accessor 18 or by a front storage cartridge 642 for cartridge removal from/insertion into a multi-cartridge deep slot cell 100. Specifically, retaining gate 660 has a pivoting arm 661 mounted on multi-cartridge deep slot cell 100 via a pivoting post (not shown) that can be integral to a construction of multi-cartridge deep slot cell 100. Pivoting arm 661 is located below a catch 662 of retaining gate 660 whereby a thrust force TF through data storage cartridge 644-642 caused by the pushing mechanism (not shown) of multi-cartridge deep slot cell 100 causes retaining gate 660 to stay closed in a retaining position as shown in FIG. 8A. Moreover, the retaining gate 660 is preferably biased such that it closes in the downward direction over the front opening of multi-cartridge deep slot cell 100. This constant biasing may be achieved via gravity as shown in FIG. 8A or by implementing a spring force, e.g., attached to retaining gate 660 (not shown).

For removal of front storage cartridge 642 by accessor 18 from multi-cartridge deep slot cell 100, retaining gate 660 must be lifted upward to a releasing position whereby catch 662 of retaining gate 660 is disengaged from front storage cartridge 642. This can be seen in FIG. 8B where accessor 18 interfaces with retaining gate 660 by providing a lifting force. Once retaining gate 660 is lifted to the releasing position and accessor 18 is engaged with storage cartridge 642, accessor 18 can pull storage cartridge 642 out of multi-cartridge deep slot cell 100 and into accessor 18 without any interference of retaining gate 660 as shown in FIG. 8C. In view of storage cartridges 644 and 643 being stored in multi-cartridge deep slot cell 100, retaining gate 660 must return to its retaining position to prevent storage cartridges 644 and 643 from being ejected from multi-cartridge deep slot cell 100 by the thrust force TF of the pushing mechanism (not shown). During extraction of front storage cartridge 642 through the front opening of multi-cartridge deep slot cell 100, the retaining gate 660, which is being biased downward, moves back to the retaining position to engage storage cartridge 643.

Figure 8B:
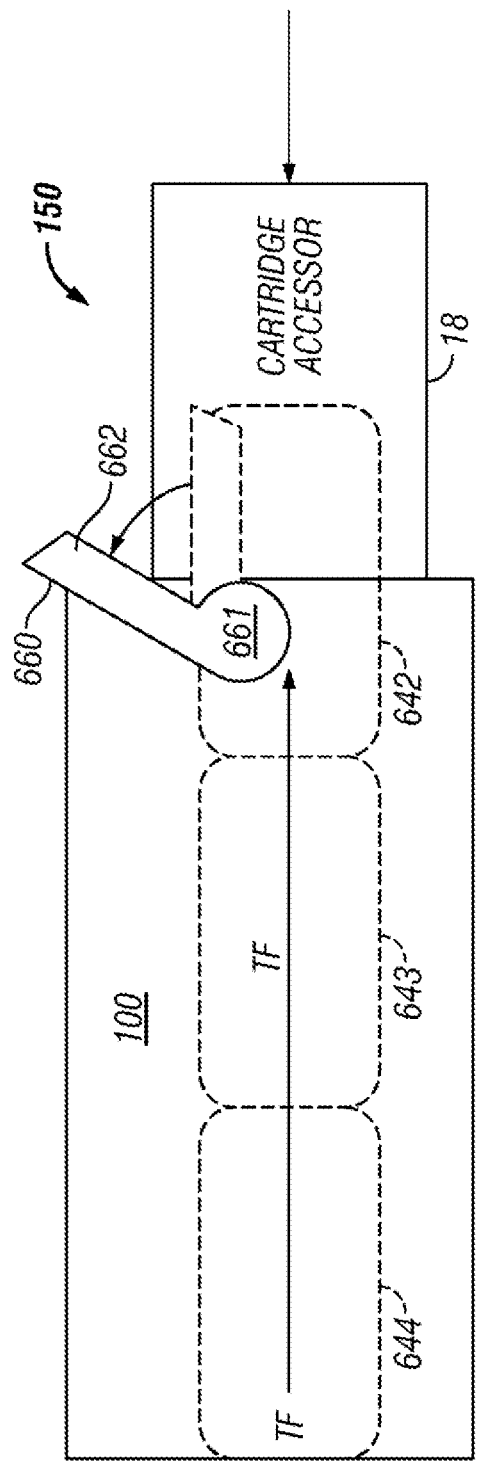

Once front storage cartridge 642 is extracted and storage cartridges 643 and 644 are retained from being pushed out of multi-cartridge deep slot cell 100, retaining gate 660 has successfully completed its cartridge retrieval process. Now retaining gate 660 demonstrates its ability to work for cartridge insertion into multi-cartridge deep slot cell 100. When accessor 18 begins to insert storage cartridge 642 back into multi-cartridge deep slot cell 100, retaining gate 660 is lifted to its releasing position to allow storage cartridge 642 through the front opening of multi-cartridge deep slot cell 100. Catch 662 of retaining gate 660 interfaces with a rear portion of storage cartridge 642, in particular a beveled surface of catch 662 as shown in FIG. 8D, whereby retaining gate 660 is lifted to its releasing position as shown in FIG. 8B due to storage cartridge 642 being pushed in multi-cartridge deep slot cell 100 by accessor 18. In doing so, storage cartridges 644, 643 are pushed deeper into multi-cartridge deep slot cell 100 by storage cartridge 642 in multi-cartridge deep slot cell 100 by accessor 18. Thus, the accessor is able to provide a force greater than the thrust force TF antiparallel thereto, to overcome the directional biasing of the storage cartridges 644, 643. Upon full insertion into multi-cartridge deep slot cell 100, retaining gate 660 moves to its retaining position to engage storage cartridge 642 as shown in FIG. 8A.

Thus, looking to various embodiments presented herein, access to a storage slot may include the ability to remove a cartridge from a storage slot, the ability to place a cartridge into a storage slot, or combinations thereof.

According to an exemplary embodiment, the storage slots from top to bottom are considered to be in parallel and comprise the same tier. Moreover, the storage slots from front to back, in a particular row, are considered to be in series and comprise sequential tiers.

Referring back to FIGS. 7A-7B, in accordance with one embodiment, storage slots 120 are depicted as being configured for storing up to a plurality of data storage cartridges 600, and arranged in sequential order of tiers 621, 622, 623, 624, 625 from front to rear. It should be noted that the frontmost tier 621 is also called "tier 1", while the next tier 622 is called "tier 2", etc., and the last tier 625 is also called the "rearmost" tier. However, referring to FIG. 2, in one embodiment, the single cartridge storage slots 16 are also termed "tier 0".

Referring again to FIGS. 1-3, according to one embodiment, the controller of automated data storage library 10 may operate the accessor(s) 18, 28 to selectively extract, place and/or transport data storage cartridges with respect to the multi-cartridge deep slot cells 100 and/or other elements of the automated data storage library 10. For example, the controller may facilitate extracting a cartridge from a multi-cartridge deep slot cell 100, transporting the cartridge to a data storage drive 15 and placing the cartridge in the drive 15. The controller may then extract the cartridge from the data storage drive 15, while directing the accessor to transport the cartridge to a specific multi-cartridge deep slot cell 100, and place the cartridge therein.

In one embodiment, one or more data storage cartridges may be added into the library, e.g., at an I/O station 24, 25, whereby the controller of the automated data storage library 10 may then operate the accessor(s) 18, 28 to transport the cartridge(s) to specific multi-cartridge deep slot cell(s) 100, and place the cartridge(s) therein. Similarly, the controller may operate the accessor(s) to selectively extract, place and transport data storage cartridges with respect to the single cartridge storage slots 16, and/or transport inserted or added cartridge(s) to specific single cartridge storage slots 16.

Figure 9:
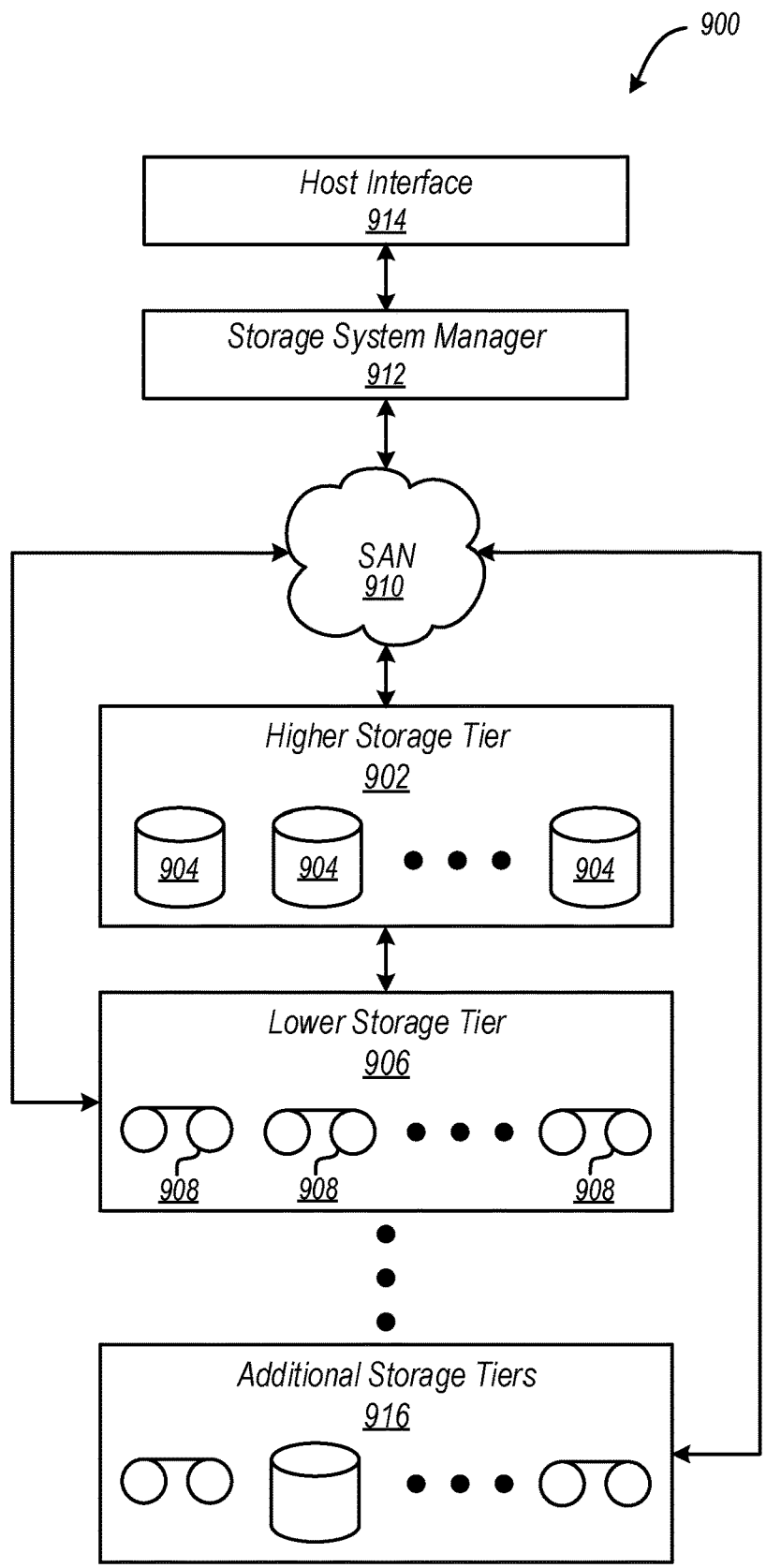
FIG. 9 is a depiction of a tiered data storage system in accordance with one embodiment.

Now referring to FIG. 9, a storage system 900 is shown according to one embodiment. Note that some of the elements shown in FIG. 9 may be implemented as hardware and/or software, according to various embodiments. In some approaches, the storage system 900 may be implemented in an automated data storage library such as that shown in FIGS. 1-2. In other approaches, an automated data storage library such as that shown in FIGS. 1-2 may be a tier of the storage system 900.

The storage system 900 may include a storage system manager 912 for communicating with a plurality of media on at least one higher storage tier 902 and at least one lower storage tier 906. The higher storage tier(s) 902 preferably may include one or more random access and/or direct access media 904, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 906 may preferably include one or more lower performing storage media 908, including sequential access media such as magnetic tape in tape drives and/or optical media, slower accessing HDDs, slower accessing SSDs, etc., and/or others noted herein or known in the art. One or more additional storage tiers 916 may include any combination of storage memory media as desired by a designer of the system 900. Also, any of the higher storage tiers 902 and/or the lower storage tiers 906 may include some combination of storage devices and/or storage media.

The storage system manager 912 may communicate with the storage media 904, 908 on the higher storage tier(s) 902 and lower storage tier(s) 906 through a network 910, such as a storage area network (SAN), as shown in FIG. 9, or some other suitable network type. The storage system manager 912 may also communicate with one or more host systems (not shown) through a host interface 914, which may or may not be a part of the storage system manager 912. The storage system manager 912 and/or any other component of the storage system 900 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 900 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 902, may include a majority of SSD storage media for storing data in a higher performing storage environment, and remaining storage tiers, including lower storage tier 906 and additional storage tiers 916 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 902, while data not having one of these attributes may be stored to the additional storage tiers 916, including lower storage tier 906. Of course, one of skill in the art, upon reading the present descriptions, may devise many other combinations of storage media types to implement into different storage schemes, according to the embodiments presented herein.

According to some embodiments, the storage system (such as 900) may include logic configured to receive a request to open a data set, logic configured to determine if the requested data set is stored to a lower storage tier 906 of a tiered data storage system 900 in multiple associated portions, logic configured to move each associated portion of the requested data set to a higher storage tier 902 of the tiered data storage system 900, and logic configured to assemble the requested data set on the higher storage tier 902 of the tiered data storage system 900 from the associated portions. Of course, this logic may be implemented as a method on any device and/or system or as a computer program product, according to various embodiments.

Data redundancy is often used to safeguard important data. Creating a second copy of all data on a magnetic storage medium (e.g., tape media in a tape cartridge) often requires that the application managing the media brings the data back through the host interface. The various copying operations conventionally consume the host computing and storage resources. Conventional copy operations are relatively complex and may not be supported by all tape applications.

Conventional copying processes include a host application mounting a first tape cartridge (e.g., comprising the data to be copied) to a first tape drive and mounting a second tape cartridge (e.g., a blank cartridge, a new cartridge, a cartridge with data to be written over, etc.) to a second tape drive. The host reads the data from the first tape cartridge through a fiber channel interface between the drives and performs the copying process utilizing various other known mechanisms. The bandwidth of the system is consumed on the fiber channel network. Writing the copy to the second tape cartridge may take many hours and consume the computing resources such that the drive is occupied for the duration of the copying process. Conventional copying approaches prevent both the first and second drives from performing backup and/or other application-initiated operations in the tape library.

In stark contrast, various embodiments described herein transparently create a second copy of data stored on tape media in a tape cartridge without consuming host resources. The tape library performs the copying process internally such that the copying operations are transparent to any host applications.

Figure 10:
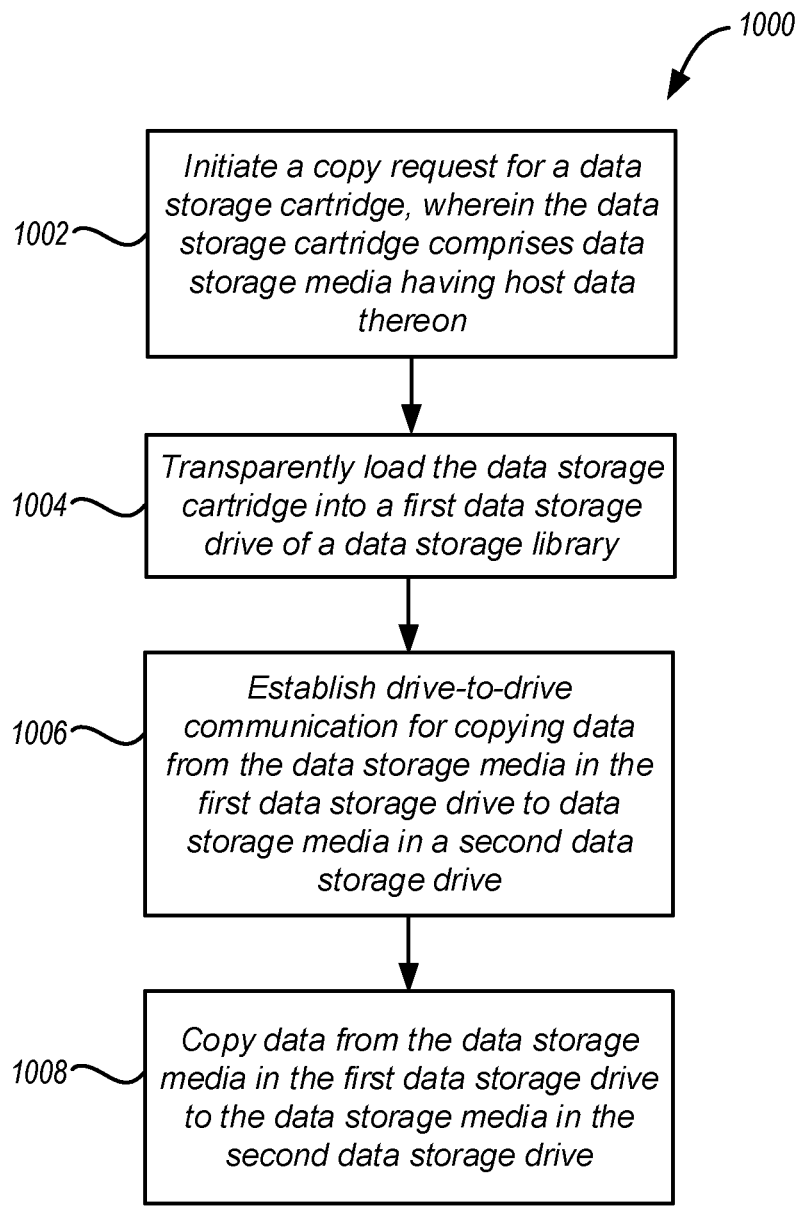
FIG. 10 is a flowchart of a method in accordance with one embodiment.

Now referring to FIG. 10, a flowchart of a method 1000 is shown according to one embodiment. The method 1000 may be performed in accordance with the present invention in any of the environments depicted in FIGS. 1-9 and 11, among others, in various embodiments. Of course, more or less operations than those specifically described in FIG. 10 may be included in method 1000, as would be understood by one of ordinary skill in the art upon reading the present descriptions.

Each of the steps of the method 1000 may be performed by any suitable component of the operating environment. For example, in various embodiments, the method 1000 may be partially or entirely performed by computers, controllers, or some other device having one or more processors therein. The processor, e.g., processing circuit(s), chip(s), and/or module(s) implemented in hardware and/or software, and preferably having at least one hardware component may be utilized in any device to perform one or more steps of the method 1000. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 10, operation 1002 includes initiating a copy request for a data storage cartridge. The data storage cartridge comprises data storage media having host data thereon. The copy request for the data storage cartridge may be initiated by a library comprising the data storage cartridge, a host, a drive configured to operate on the data storage cartridge, a user, a service provider, a content provider, a default setting, etc. In one embodiment, the copy request may be initiated within a data storage library. In another embodiment, the copy request may be initiated via a management interface of a data storage library.

For example, after firmware that supports copy requests is installed within the data storage library, a copy request may be received via a network-based user interface of the data storage library. In another example, after pre-written data storage cartridges have been bulk loaded into the data storage library, a copy request may be received via a network-based user interface of the data storage library.

In another example, the copy request may be initially received utilizing one or more management interfaces of the data storage library. For instance, the copy request may be received from an entity (e.g., one or more of a user, an application, etc.), using one or more management interfaces. In another example, the one or more management interfaces may include one or more of a remote network interface, a web user interface, a graphical user interface (GUI), an operator panel operatively coupled to the data storage library, a command line interface supported by the data storage library, an application programming interface (API), a simple network management protocol (SNMP) interface, etc. In one embodiment, the copy request may be received at a storage system manager 912 (see FIG. 9). In another embodiment, the one or more management interfaces may send the copy request to a library controller of the data storage library.

In another embodiment, the copy request may be received from a host system. For example, a copy request may be received from a host application running within the host system. In another embodiment, the host application may include an application running within the host system that accesses the data storage library (e.g., to read and write data to and from data storage cartridges within the library, etc.). In yet another embodiment, the host application may include a backup application running on the host system.

In another embodiment, the copy request may be initiated automatically according to one or more predetermined criteria. For example, a copy request may be periodically created/updated for one or more data storage cartridges within the data storage library according to a predetermined schedule. In another example, the data storage library may perform the copy request according to a predetermined date and/or time. In yet another example, the data storage library may perform the copy request in response to new data being introduced into the data storage library. In another approach, the data storage library may initiate the copy request when the data storage library is or becomes idle (e.g., when the data storage library is not performing any host media access operations) and/or when one or more data storage drives are or become idle.

In another example, the copy request may be initiated in response to existing data being removed from the data storage library. In yet another example, the copy request may be initiated in response to an identified writing and/or erasing of data from within the data storage library. In another example, the copy request may be initiated in response to the source media integrity being brought into question (e.g., read and/or write errors exceed a certain threshold).

Operation 1004 includes transparently loading the data storage cartridge into a first data storage drive of a data storage library. Transparent loading may refer to concealing (from one or more host applications) the fact that a data storage drive is loaded with a data storage cartridge for use in creating a second copy of the data. For example, the data storage library may report the data storage drive as being empty and/or the data storage library may instruct the data storage drive to report itself as being empty, when a data storage cartridge is loaded in the data storage drive. Alternatively, transparently may refer to the use of a utility or spare drive that is not within the scope or view of one or more host applications so there is no need to falsely report the drive as being empty. In addition, transparent loading may refer to concealing (from one or more host applications) the location of a data storage cartridge. For example, the library may report a data storage cartridge as being in its home slot when the data storage cartridge is really loaded in a data storage drive. In other approaches, transparently loading as used throughout the present disclosure may refer to concealing from the storage system manager 912 (see FIG. 9) the location of a data storage cartridge.

In another embodiment, a plurality of data storage cartridges may be transparently loaded into a plurality of data storage drives within the data storage library. In one preferred embodiment, one or more data storage cartridges may be reported as being in a respective home slot when the data storage cartridges are really loaded in data storage drives. In another embodiment, loading the data storage cartridge may include sending one or more instructions to a robotic mechanism (e.g., an accessor, etc.) to physically select the data storage cartridge and move the data storage cartridge into the data storage drive.

In one embodiment, the first data storage drive may include a host application drive. In any of the embodiments disclosed herein, identifying a first data storage drive may refer to identifying a host application drive and vice versa. For example, the host application drive may include a data storage drive of the data storage library that is accessible/viewable by one or more host applications and/or a storage system manager. In one example, the data storage cartridge may be transparently loaded into a host application drive of the data storage library.

For instance, the library controller may identify a host application drive that is not currently being used within the data storage library. In one embodiment, the library controller may then automatically load the data storage cartridge into the host application drive. In another embodiment, the host application drive may be presented as empty to all host applications running on host systems. For example, if a host application requests a library map (e.g., element address table, inventory data, etc.) from the library controller, the library controller may provide a library map to the host application indicating that the data storage drive is empty.

In one embodiment, the first data storage drive may include a utility drive. For example, the utility drive may include a data storage drive of the data storage library that is not accessible/viewable by any host applications. In another embodiment, the library controller may identify a utility drive that is not currently being used within the data storage library, and may transparently load the data storage cartridge into the utility drive of the data storage library. In yet another embodiment, the data storage cartridge may be presented by the library controller as being in its home slot.

In yet another embodiment, the library controller may identify any drive that is not currently being used within the data storage library, and may transparently load the data storage cartridge into the identified drive of the data storage library. In yet another embodiment, the data storage cartridge may be presented by the library controller as being in its home slot.

For example, if a host application requests inventory data from the library controller, the library controller may provide inventory data to the host application indicating that the data storage cartridge is in its home slot, and not in the utility drive. In this way, the utility drive may not be visible to host applications, and may therefore not have to be instructed to identify as empty if its status is queried by any host application. In yet another embodiment, a plurality of cartridges may be transparently loaded into both of one or more host application drives and one or more utility drives simultaneously, in response to receiving the copy request.

In another embodiment, the data storage drive may be instructed to identify as empty if its status is queried by any host application. In this way, the data storage drive may appear as empty/open/accessible by both the library controller and the data storage drive itself. In another embodiment, the transparently loaded data storage cartridge may be presented by the library controller as being in its home slot. For example, the library controller may receive a request from a host application for inventory data, and in response, the library controller may provide inventory data to the host application indicating that the data storage cartridge is in its home slot, and not in the data storage drive.

Operation 1006 includes establishing drive-to-drive communication for copying data from the data storage media in the first data storage drive to data storage media in a second data storage drive. Drive-to-drive communication may be initiated in any manner known in the art. Drive-to-drive communication may be initiated in any manner described above with reference to initiating a copy request. Moreover, the data storage media in the second data storage drive may be loaded transparently in a similar manner as the data storage media is transparently loaded in the first data storage drive, e.g., as in operation 1004. Specifically, a second data storage cartridge comprising data storage media may be loaded transparently into a second data storage drive of the data storage library according to any of the embodiments described in detail above.

In one embodiment, one of the data storage drives is a utility drive and the other data storage drive is a host application drive. In another embodiment, the first storage drive and the second storage drive are utility drives. In yet another embodiment, the first storage drive and the second storage drive are host application drives.

Operation 1008 includes performing the copying. Performing the copying includes copying data from the data storage media in the first data storage drive to the data storage media in the second data storage drive. The data may include some or all of the host data on the data storage media in the first data storage drive. Operation 1008 may include any copying operations known in the art. In addition, the data may be copied utilizing the host interfaces of the data storage drives, proprietary interfaces of the data storage drives, wireless interfaces of the data storage drives, wired interfaces of the data storage drives, etc., or combinations thereof.

In various embodiments, some or all of method 1000 is initiated automatically according to a predetermined schedule. For example, establishing the drive-to-drive communication and performing the copying according to a predetermined schedule may include copying data from data storage cartridges that have not been copied in a predetermined amount of time. One or more data storage cartridges may be selected for copying data according to the predetermined schedule. For example, a subset of data storage cartridges may be selected for copying data according to a predetermined policy. Any predetermined value and/or time period as discussed herein may be set by a user, a manufacturer, a host application, a default setting, a content provider, a service provider, an operator, etc. Any predetermined value and/or time period as discussed herein may be found in a look-up table.

In another embodiment, some or all of method 1000 may be initiated in response to determining that the health of the data storage media is below a predetermined threshold. For example, after a certain amount of difficulty is observed for accessing data on a data storage cartridge (e.g., a large number of error recovery procedures are required to access data on the cartridge), the data storage cartridge may be flagged for requiring a copy to be made. In another example, an automated data storage library may provide a media verification function where the data storage cartridges are periodically accessed (e.g., loaded, mounted, read, and/or written) to confirm that the data storage cartridges and/or the media within the data storage cartridges is still viable. A copy request or update operation may be used as another mechanism for indicating that the media is viable. For example, as data is copied from a data storage cartridge, the data storage cartridge may be flagged as being "verified" for purposes of media verification. As referred to herein, media verification may refer to verification of the data storage cartridge and/or the storage medium associated with the data storage cartridge.

Any known technique for determining the health of the data storage media may be used. Any predetermined threshold for the health of the data storage media may be used. The predetermined threshold may be set by a user, a manufacturer, a host application, a default setting, a content provider, a service provider, an operator, etc. In one embodiment, the predetermined threshold may be found in a look-up table.

In other approaches, some or all of method 1000 may be manually initiated by a user.

In preferred embodiments of method 1000, in response to a host request for the data storage cartridge, the method 1000 includes checkpointing the drive-to-drive communication. Checkpointing the drive-to-drive communication includes copying all the data from a point in time or later, and the duplicated data may be stored in association with the checkpoint, as would be understood by one having ordinary skill in the art. In the event of a failure, the checkpoint may be recovered from the filesystem storage, and the data may be restored to the state in which the data existed immediately prior to the failure using lineage information, as would be understood by a skilled artisan upon reading the present descriptions.

In one example, a checkpoint file may include a file used to rebuild data after data corruption, an unexpected shutdown, etc. In another example, a checkpoint file may be identified using metadata, and may be used to rebuild database tables in memory after data loss event.

In various embodiments, a host request for the data storage cartridge may be received in any manner known in the art. In one embodiment, in response to receiving a host request for the data storage cartridge, the drive-to-drive communication is interrupted. In another embodiment, in response to receiving a host request for the data storage cartridge, the method 1000 includes performing an operation. The operation may include at least one of: checkpointing the drive-to-drive communication, interrupting the drive-to-drive communication, performing an action associated with the host request on the data storage cartridge, etc. In yet another embodiment, in response to receiving a host request for the data storage cartridge, the method 1000 includes checkpointing the drive-to-drive communication, interrupting the drive-to-drive communication, and performing an action associated with the host request on the data storage cartridge. Any action associated with the host request on the data storage cartridge may be performed. An action associated with the host request on the data storage cartridge may comprise a request to move the data storage cartridge to another data storage drive, a read/write request, an eject request, a request to move the data storage cartridge to another storage slot, or any other operation that a host application may request an automated data storage library to perform with respect to a data storage cartridge. In some approaches, the copy operation is paused to be reinitiated at a later point in response to a trigger event, e.g., in response to performing an action associated with the host request on the data storage cartridge, in response to determining that there are empty drives in the library, in response to determining that there are empty drives in the library that the host application is not attempting to use, etc.

In other approaches, the host request may be for the data storage drive comprising the data storage cartridge. In various embodiments, the data storage cartridge may be moved from the data storage drive that is in conflict with the host request for the data storage drive. The data storage cartridge may be moved to another data storage drive which is not in conflict with the host request. In response to the data storage cartridge being moved to another data storage drive which is not in conflict with the host request, the method 1000 may include resuming the copy operation in the different data storage drive. In response to the data storage cartridge being moved to another data storage drive which is not in conflict with the host request, the method 1000 may include reinitiating the copy operation in the different data storage drive.

In various approaches, the method 1000 includes resuming the drive-to-drive communication in response to performing the operation.

In one embodiment, in response to a host request for ejecting the data storage cartridge, the method 1000 includes aborting the drive-to-drive communication and ejecting the data storage cartridge. For example, in response to a request for the data storage cartridge, the data storage cartridge is completely ejected from the library (e.g., comprising multiple data storage drives) and/or from the data storage drive in a stand-alone data storage drive.

In one embodiment, all or part of the copied data may be stored within media other than the media within the data storage cartridge. For example, all or part of the copied data may be stored within one or more hard drives, flash drives, solid state drives (SSDs), tape drives, optical drives, cloud storage, etc. In another example, all or a portion of the media other than the media within the data storage cartridge may be located within the data storage library. In yet another example, all or a portion of the media other than the media within the data storage cartridge may be located outside the data storage library. In still another example, the media other than the media within the data storage cartridge may be removably coupled to the data storage drive.

Figure 11:
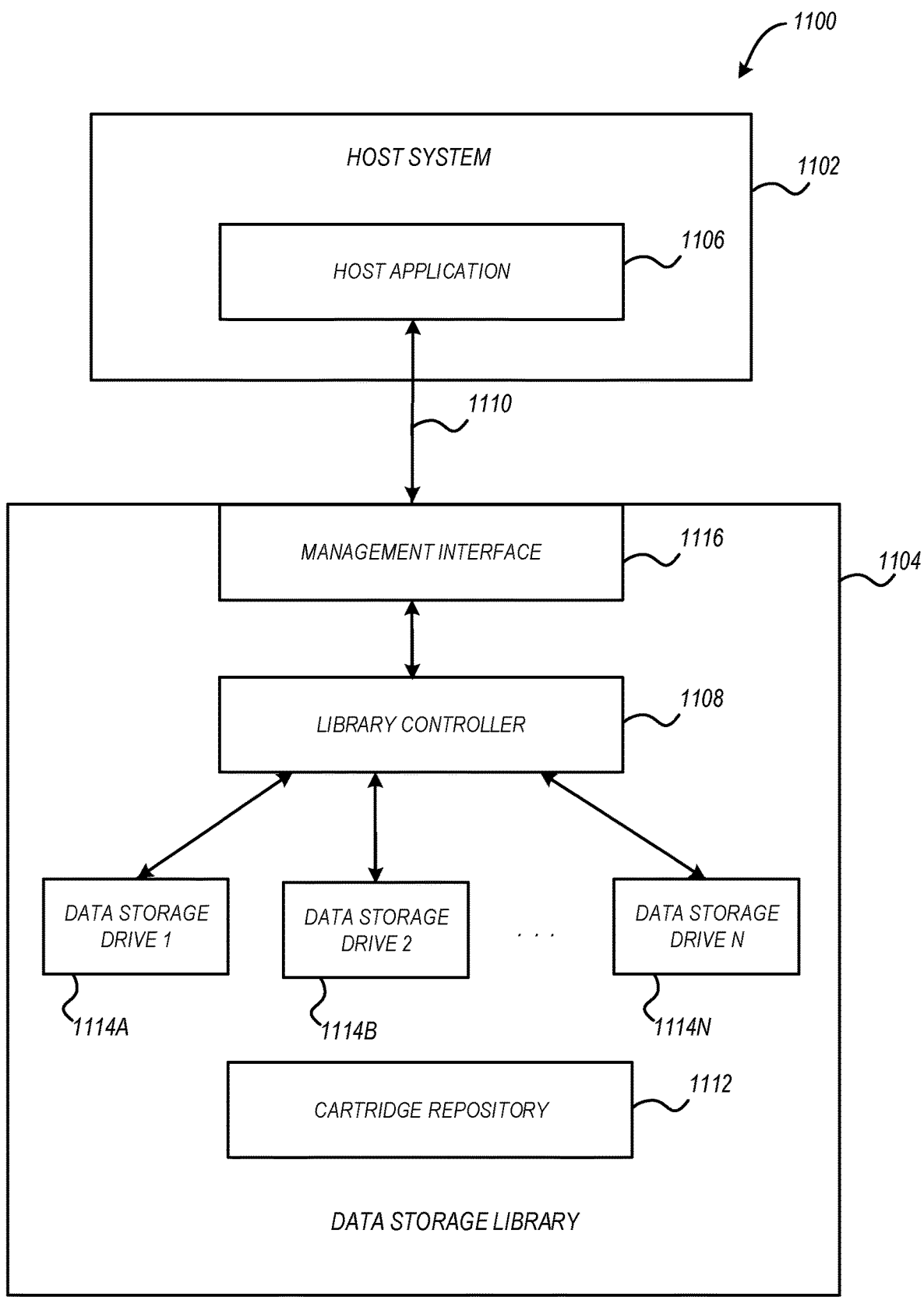
FIG. 11 illustrates an exemplary cartridge transparent copying environment in accordance with one embodiment.

FIG. 11 illustrates an exemplary cartridge transparent copying environment 1100, according to one exemplary embodiment. As shown, a host system 1102 is in communication with a data storage library 1104. It should be noted that, although a single host system 1102 is pictured, a plurality of host systems may be in communication with the data storage library 1104 simultaneously.

Additionally, in one embodiment, a host application 1106 running within the host system 1102 may send a copy request to a management interface 1116 of the data storage library 1104 over a communications network 1110. It should be noted that, although a single host application 1106 is pictured, a plurality of host applications may be in communication with the data storage library 1104 simultaneously. In one embodiment, the communications network 1110 may include an ethernet connection, a fiber channel connection, SAS (Serial Attached SCSI connection), etc. The copy request may be received from an entity other than the host system 1102. In another embodiment, in response to receiving the copy request, the management interface 1116 may send the copy request to the library controller 1108 within the data storage library 1104. In yet another embodiment, in response to receiving the copy request, the library controller 1108 may initiate the drive-to-drive communication. Of course, however, the library controller 1108 may initiate the copy request and/or the drive-to-drive communication in response to other criteria (e.g., in response to a predetermined schedule, in response to a user request, in response to data being introduced, modified and/or removed within the data storage library 1104, etc.).

In another embodiment, the library controller 1108 may identify a data storage drive 1114A as open/empty/available from a plurality of data storage drives 1114A-N. In still another embodiment, more than one library controller 1108 may be located within the data storage library 1104.

Further, in one embodiment, in response to initiating the copy request, the library controller 1108 may also select a first data storage cartridge containing data for the copy request from the data storage cartridge repository 1112. In one embodiment, the first data storage cartridge may be identified within the request to perform the copy request. In another embodiment, the first data storage cartridge may be identified as storing data to be copied.

In another embodiment, the library controller 1108 may transparently load the first data storage cartridge into the data storage drive 1114A. In another embodiment, the library controller 1108 may instruct the data storage drive 1114A to perform copy operations for data stored within the first data storage cartridge. In yet another embodiment, the library controller 1108 may retrieve, from the data storage drive 1114A, data from the first data storage cartridge, and the library controller 1108 may create a copy of the data utilizing the retrieved data.

Further still, in one embodiment, because the library controller 1108 may transparently load the selected cartridge into the data storage drive 1114A, the host application 1106 may view the data storage drive 1114A as open/empty/available, and may send an access request for data on a second data storage cartridge, utilizing the data storage drive 1114A, to the library controller 1108. In response to receiving the access request, the library controller 1108 may determine that the copy request utilizing the first data storage cartridge on the data storage drive 1114A has not completed, and may postpone various copying operations utilizing the first data storage cartridge on the data storage drive 1114A as a result.

In another embodiment, a copy of the data may be stored within the first data storage cartridge, within another data storage cartridge different from the first data storage cartridge, within removable media attached to the data storage drive 1114A, within a cloud storage environment, within the library controller 1108, within the host system 1102, within other storage associated with a data storage drive or the library controller 1108, etc.

Also, in one embodiment, the library controller 1108 may then transparently remove the first data storage cartridge from the data storage drive 1114A, and may return the first data storage cartridge to the data storage cartridge repository 1112. Alternatively, the library controller 1108 may transparently remove the first data storage cartridge from the data storage drive 1114A, and may place it in another empty data storage drive (e.g., data storage drive 1114B) in a transparent manner for the purpose of resuming or restarting the copy operations on the first data storage cartridge. The library controller 1108 may then retrieve the second data storage cartridge from the data storage cartridge repository 1112 and may load the second data storage cartridge into the data storage drive 1114A in a non-transparent manner (e.g., such that the host application 1106 now views the data storage drive 1114A as full, and/or the second data storage cartridge as being located in the data storage drive 1114A, etc.). Access to the data on the second data storage cartridge may then be performed utilizing the data storage drive 1114A, according to requests sent by the host application 1106.

In addition, once the access to the data on the second data storage cartridge has completed, the library controller 1108 may then remove the second data storage cartridge from the data storage drive 1114A and may place the second data storage cartridge back in the data storage cartridge repository 1112 in a non-transparent manner (e.g., such that the host application 1106 now views the data storage drive 1114A as empty and/or the second data storage cartridge as being located in the data storage cartridge repository 1112, etc.). The library controller may then transparently load the first data storage cartridge back into the data storage drive 1114A, and may resume or restart the copying operations utilizing data stored on the first data storage cartridge (unless the data storage cartridge had already been loaded into another empty drive as described above).

Furthermore, in one embodiment, the data is copied from data storage drive 1114A, to another data storage cartridge in another data storage drive (e.g., 1114N) using a host interface of the data storage drive (not shown). For example, the data being copied may travel from a fiber channel interface of a source drive, through one or more fiber channel switches or hubs, and then into the fiber channel interface of a destination drive. Alternatively, the data may be copied from data storage drive 1114A, to another data storage cartridge in another data storage drive (e.g., 1114N) using a library interface of the data storage drive. For example, the data being copied may travel from a library interface on a source drive, through a switch, hub, or a library controller (e.g., 1108) and then into the library interface of a destination drive. Still further, the data may be copied from data storage drive 1114A, to another data storage cartridge in another data storage drive (e.g., 1114N) using another interface of the data storage drive. For example, the data being copied may travel from a wireless interface or another wired interface of the source and/or destination drives. In addition, combinations of interfaces may be utilized (e.g., data traveling on a wireless interface on the source drive may eventually go through a library interface on the destination drive).

In another embodiment, when the copying operations utilizing data stored on the first data storage cartridge has completed, the library controller may send the copied data to the management interface 1116 of the data storage library 1104, and the management interface 1116 may return the copied data to the host system 1102 (or any other entity that initiated the request). In another embodiment, the copied data may be returned utilizing a different management interface from the management interface 1116 used by the library controller 1108 to receive the copy request.

In yet another embodiment, the copied data may be stored within the first data storage cartridge, within another data storage cartridge different from the first data storage cartridge, within removable media attached to the data storage drive 1114A, within a cloud storage environment, within the library controller 1108, within the host system 1102, etc.

In this way, copied data may be created at the library controller 1108 and/or the data storage drive 1114A, instead of at the host application 1106 of the host system 1102. This may reduce an amount of processing by the host system 1102, may reduce an amount of necessary transmissions sent by the library controller 1108, and may reduce an amount of bandwidth usage over the communications network 1110.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

A data processing system suitable for storing and/or executing program code may include at least one processor, which may be or be part of a controller, coupled directly or indirectly to memory elements through a system bus, such as processor 400 of FIG. 4. The memory elements can include local memory employed during actual execution of the program code, such as nonvolatile memory 404 of FIG. 4, bulk storage, and cache memories which provide temporary storage of at least some program code in order to reduce the number of times code must be retrieved from bulk storage during execution.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   initiating a copy request for a data storage cartridge located in a storage slot, wherein the data storage cartridge comprises data storage media having host data thereon;
   retrieving the data storage cartridge from the storage slot;
   transparently loading the data storage cartridge into a first data storage drive of a data storage library, the transparently loading including reporting the data storage cartridge as being located in the storage slot while the data storage cartridge is loaded in the first data storage drive;
   establishing drive-to-drive communication for copying data from the data storage media in the first data storage drive to data storage media in a second data storage drive located in the data storage library; and
   copying, internally within the data storage library, data from the data storage media in the first data storage drive to the data storage media in the second data storage drive without consuming host resources.

2. The computer-implemented method of claim 1, wherein transparently loading the data storage cartridge into the first data storage drive of the data storage library includes:
   identifying a host application drive that is not currently being used within the data storage library, the host application drive being the first data storage drive;
   loading the data storage cartridge into the host application drive; and
   presenting the host application drive as empty to at least one host application running on at least one host system.

3. The computer-implemented method of claim 1, wherein the data storage library is a data storage library having a library controller that controls operation of the first and second data storage drives within the data storage library.

4. The computer-implemented method of claim 1, wherein transparently loading the data storage cartridge into the first data storage drive of the data storage library includes:
   identifying a drive that is not currently being used within the data storage library;
   loading the data storage cartridge into the drive of the data storage library; and
   presenting the data storage cartridge as being in a storage slot while the data storage cartridge is loaded in the first data storage drive.

5. The computer-implemented method of claim 1, wherein the copy request is initiated automatically according to a predetermined schedule.

6. The computer-implemented method of claim 1, wherein one of the data storage drives is a utility drive and the other data storage drive is a host application drive, wherein the utility drive is not accessible by any host applications and is not viewable by any host applications.

7. The computer-implemented method of claim 6, wherein the first data storage drive and the second data storage drive are utility drives.

8. The computer-implemented method of claim 1, wherein the copy request is initiated in response to determining that a health of the data storage media is below a predetermined threshold, wherein the health of the data storage media is determined based at least in part on a predetermined number of error recovery procedures being performed on the data storage media.

9. The computer-implemented method of claim 1, comprising, in response to receiving a host request for the data storage cartridge, performing an operation selected from the group consisting of:
   checkpointing the drive-to-drive communication;
   performing an action associated with the host request on the data storage cartridge.

10. The computer-implemented method of claim 9, comprising resuming the drive-to-drive communication in response to performing the operation.

11. The computer-implemented method of claim 1, comprising, in response to a host request for ejecting the data storage cartridge:
    aborting the drive-to-drive communication; and
    ejecting the data storage cartridge.

12. A data storage library, comprising:
    a library controller;
    a first data storage drive under direct control of the library controller; and
    a second data storage drive under direct control of the library controller,
    the library controller being configured to:
    initiate a copy request for a data storage cartridge located in a storage slot, wherein the data storage cartridge comprises data storage media having host data thereon;
    transparently load the data storage cartridge into the first data storage drive, wherein transparently loading the data storage cartridge into the first data storage drive comprises presenting the data storage cartridge as being located in the storage slot while the data storage cartridge is loaded in the first data storage drive;
    establish drive-to-drive communication within the data storage library for copying data from the data storage media in the first data storage drive to data storage media in a second data storage drive that is also in the data storage library;
    copy data from the data storage media in the first data storage drive to the data storage media in the second data storage drive; and
    in response to receiving a host request for the data storage cartridge in the first data storage drive and/or the second data storage drive, performing a sub-method comprising:
    interrupting the drive-to-drive communication,
    moving the data storage cartridge from the first data storage drive, continuing to report the data storage cartridge as being in the storage slot, and resuming the copying using a different storage drive which is not in conflict with the host request.

13. The data storage library of claim 12, wherein transparently loading the data storage cartridge into the first data storage drive of the data storage library comprises:

sending one or more instructions to a robotic mechanism to physically select the data storage cartridge and move the data storage cartridge into the first data storage drive.

14. The data storage library of claim 12, wherein the copy request is initiated automatically according to a predetermined schedule.

15. The data storage library of claim 12, wherein the copy request is initiated in response to determining that a health of the data storage media is below a predetermined threshold, wherein the health of the data storage media is determined based at least in part on a predetermined number of error recovery procedures being performed.

16. The data storage library of claim 12, wherein one of the data storage drives is a utility drive and the other data storage drive is a host application drive, wherein the utility drive is not accessible and is not viewable by any host applications running on host systems, wherein the host application drive is presented as empty to all of the host applications running on the host systems.

17. The data storage library of claim 12, wherein transparently loading the data storage cartridge into the first data storage drive of the data storage library comprises logic configured to:

identify a host application drive that is not currently being used within the data storage library;

send one or more instructions to a robotic mechanism to physically select the data storage cartridge and move the data storage cartridge from the storage slot to the host application drive;

load the data storage cartridge into the host application drive; and present the host application drive as empty to at least one host application running on at least one host system.

18. A computer program product, the computer program product comprising a computer readable storage medium having program instructions embodied therewith, the program instructions executable by a library controller to cause the library controller to:

initiate, by the library controller, a copy request for a data storage cartridge located in a storage slot, wherein the data storage cartridge comprises data storage media having host data;

transparently load, by the library controller, the data storage cartridge into a first data storage drive of a data storage library, the first data storage drive being under direct control of the library controller;

establish, by the library controller, drive-to-drive communication for copying data from the data storage media at the first data storage drive to data storage media in a second data storage drive of the same data storage library, the second data storage drive being under direct control of the library controller, wherein one of the data storage drives is a utility drive which is not accessible by a host application that accesses the other of the data storage drives; and copy, by the computer, data from the data storage media in the first data storage drive to the data storage media in the second data storage drive, wherein transparently loading the data storage cartridge into the first data storage drive of the data storage library includes: presenting the data storage cartridge as being located in the storage slot while the data storage cartridge is loaded in the first data storage library.

19. The computer program product of claim 18, wherein the copy request is initiated in response to determining that a health of the data storage media is below a predetermined threshold, wherein the health of the data storage media is determined based at least in part on a predetermined number of error recovery procedures being performed.

* * * * *